(12) United States Patent
Sheppard et al.

(10) Patent No.: US 7,393,592 B2
(45) Date of Patent: *Jul. 1, 2008

(54) LAMINATION GRADE COEXTRUDED HEAT-SEALABLE FILM

(75) Inventors: Karen A. Sheppard, Victor, NY (US); Robert A. Migliorini, North Haven, CT (US)

(73) Assignee: ExxonMobil Oil Corporation, Irving, TX (US)

( * ) Notice: Subject to any disclaimer, the term of this patent is extended or adjusted under 35 U.S.C. 154(b) by 281 days.

This patent is subject to a terminal disclaimer.

(21) Appl. No.: 10/809,259

(22) Filed: Mar. 25, 2004

(65) Prior Publication Data

US 2004/0209070 A1    Oct. 21, 2004

Related U.S. Application Data

(63) Continuation-in-part of application No. 09/714,332, filed on Nov. 16, 2000, now abandoned.

(51) Int. Cl.
*B32B 27/32* (2006.01)
*B32B 5/16* (2006.01)
*B32B 27/00* (2006.01)
*B32B 27/08* (2006.01)

(52) U.S. Cl. .................. 428/500; 428/220; 428/323; 428/327; 428/332; 428/515; 428/446; 428/447; 428/923; 428/926

(58) Field of Classification Search .................. None
See application file for complete search history.

(56) References Cited

U.S. PATENT DOCUMENTS

| | | | |
|---|---|---|---|
| 4,632,869 A * | 12/1986 | Park et al. ............... 428/315.5 | |
| 4,692,379 A | 9/1987 | Keung et al. | |
| 4,769,418 A | 9/1988 | Mizuno et al. | |
| 4,916,025 A | 4/1990 | Lu | |
| 4,978,436 A | 12/1990 | Kelly | |
| 5,169,900 A | 12/1992 | Gudelis | |
| 5,223,346 A | 6/1993 | Lu | |
| 5,302,442 A | 4/1994 | O'Brien et al. | |
| 5,443,915 A | 8/1995 | Wilkie et al. | |
| 5,466,734 A | 11/1995 | Catena et al. | |
| 5,482,780 A | 1/1996 | Wilkie et al. | |
| 5,489,473 A | 2/1996 | Wilkie | |
| 5,500,283 A | 3/1996 | Kirk et al. | |
| 5,527,608 A | 6/1996 | Kemp-Patchett et al. | |
| 5,616,400 A | 4/1997 | Zhang | |
| 5,667,902 A | 9/1997 | Brew et al. | |
| 5,691,043 A | 11/1997 | Keller et al. | |
| 5,792,549 A | 8/1998 | Wilkie | |
| 5,798,174 A | 8/1998 | Wilkie | |
| 5,851,640 A * | 12/1998 | Schuhmann et al. ........ 428/200 |
| 6,074,762 A * | 6/2000 | Cretekos et al. ............ 428/516 |
| 6,455,150 B1 | 9/2002 | Sheppard et al. | |
| 6,472,077 B1 * | 10/2002 | Cretekos et al. ............ 428/447 |
| 6,495,246 B1 | 12/2002 | Sakaguchi et al. | |
| 6,495,266 B1 | 12/2002 | Migliorini | |

FOREIGN PATENT DOCUMENTS

| | | |
|---|---|---|
| JP | 02 060745 A | 5/1990 |
| JP | 03 205440 A | 12/1991 |
| JP | 04 212848 A | 11/1992 |
| WO | WO02/40269 | 5/2002 |

OTHER PUBLICATIONS

Corbett, L.W. & R. Urban, Asphalt and Bitumen, Ullmann's Encyclopedia of Industrial Chemical, W. Gerhartz Deerfield Beach Florida, USA, Velt Publ., vol. A.3, pp. 169-188, (1985).

* cited by examiner

*Primary Examiner*—Sheeba Ahmed

(57) ABSTRACT

A coextruded, heat-sealable film structure includes a core layer of a thermoplastic polymer having a first side and a second side. A functional layer which is printable, sealable, or can be laminated or is treatable for printing, sealing, or laminating is on the first side of the core layer. A heat-sealable layer is on the second side of the core layer. The heat-sealable layer is composed of a thermoplastic polymer and an amount of a slip system, based upon the entire weight of the heat-sealable layer, sufficient to reduce the coefficient of friction and improve the slip performance of the film structure. The slip system is composed of a silicone gum and at least one antiblocking agent. The film structure exhibits the desirable combination of improved converting performance and excellent machinability performance.

18 Claims, No Drawings

LAMINATION GRADE COEXTRUDED HEAT-SEALABLE FILM

This Application claims the benefit of and is a Continuation-in-Part of regular U.S. patent application Ser. No. 09/714,332 filed Nov. 16, 2000 now abandoned.

BACKGROUND OF THE INVENTION

The invention relates to an improved, lamination grade, coextruded, heat-sealable film. More precisely, the invention relates to a lamination grade, coextruded, heat-sealable multilayer film, having a core layer, a functional layer, and a heat-sealable layer, which exhibits excellent slip and machinability performance, as well as improved ink adhesion and lamination bond strengths, and which contains a non-migrating slip system requiring no aging time or temperature regulation.

Highly desirable properties of a single multilayer film include the ability to (i) function very well as both an outside and an inside web in a lamination (ii) exhibit excellent COF and machinability even after printing and laminating, (iii) exhibit excellent ink adhesion and bond strengths in lamination, and (iv) be prepared without migrating additives that require aging after production.

In general, a film used as an outside web in a lamination comprises a heat sealable layer with a relatively high melting point resin. The film used as an outside web tends to be less tacky or less sticky than the film used as an inside web. A film used as an outside web in a lamination should exhibit excellent machinability.

Improved film machinability allows greater amounts of film to be run through packaging equipment without jamming the equipment and also allows higher machine speeds to be used. Machinability can be tested by a "force over forming collar" test, wherein a film is pulled over a forming collar with force, and the higher the force needed, the less machinable the film is. Machinability can also be tested by a "hot slip" test, wherein the sealing bars of the packaging machine are heated up to 290° F., and the film is pulled over the forming collar with force. Again, the more force that is necessary, the less machinable the film is.

The most important property of a film used as an inside web in a lamination is the sealability of the film. The lower the minimum sealing temperature of the film, the broader the range of temperature that can be used to seal the film.

A film used as an inside web in a lamination should also exhibit good "hot tack." "Hot Tack" is the strength of a heat seal immediately after sealing while still in a hot condition, i.e. before it has cooled down to ambient temperature and achieved its final strength.

Unmodified multilayer film with heat-sealable skin layers has an inherently high coefficient of friction (COF) and film-to-film blocking properties. Therefore, slip additives and antiblocking particulates are traditionally added to the film structure to lower the COF and provide improved machinability to produce, for example, food packages.

The slip properties of multilayer film have been beneficially modified by the inclusion of polymers of fatty acid amides, such as erucamide or oleamide. These fatty acid amide materials, however, disadvantageously depend on film temperature and storage time to promote the migration and effectiveness of this type of slip system. Fatty acid amide slip systems also have reduced functionality when the film is laminated to other non-slip containing films and the COF increases after lamination. Therefore, the production and functionality of fatty acid amide slip systems is limited.

Improved COF and slip functionality can also be gained by the incorporation of silicone oil into the skin layer of a multilayer film. Immediately upon winding a film with one skin layer containing silicone oil, the opposite side of the film structure is lubricated. Therefore, it is relatively easy to obtain a multilayer film with excellent slip performance on both sides when silicone oil is incorporated into the skin layer of a multilayer film. Films containing an appropriate concentration of silicone oil also tend to perform well in lamination on packaging machines and maintain a low COF.

A disadvantage with silicone oil slip systems, however, is the difficulty in converting a multilayer film that employs a silicone oil slip system. Silicone oil tends to transfer from one film surface to another upon winding of the film. Due to the silicone oil lubrication on both sides of the film, the treated surface becomes contaminated and consequently makes printing and ink adhesion more difficult. Additionally, if printing and laminating are done in two steps, i.e., out-of-line, then silicone oil can also transfer to the surface of the ink and cause future lamination bonding strengths to be low or inconsistent.

SUMMARY OF THE INVENTION

There is provided a coextruded, heat-sealable film structure, comprising:
(a) a core layer of a thermoplastic polymer, the core layer having a first side and a second side;
(b) a functional layer on the first side of the core layer, wherein the functional layer is a laminating layer, a printable layer, a laminating and a printable layer, or a sealable layer; and
(c) a heat-sealable layer on the second side of the core layer comprising a thermoplastic polymer and an amount of a slip system, based upon the entire weight of the heat-sealable layer, sufficient to reduce the coefficient of friction and improve slip performance of the heat-sealable layer, wherein the slip system comprises silicone gum and antiblocking agents.

Compared to silicone oil, silicone gum tends to migrate less throughout the multilayer film and tends to transfer less from one film surface to another upon winding of the film.

The coextruded, heat-sealable multilayer film exhibits an excellent COF, hot slip, and machinability, even after printing and laminating, and excellent ink adhesion and bond strength in lamination. The present multilayer film can function very well as both an inside and outside web in a lamination.

DETAILED DESCRIPTION OF THE INVENTION

The coextruded, heat-sealable film structure includes a core layer. The core layer comprises a polymeric matrix comprising a film-forming thermoplastic polymer which has properties suitable for extrusion or coextrusion followed by biaxial orientation in the machine and transverse directions under elevated temperature so as to form a film. The polymeric matrix can be a propylene homopolymer or a propylene copolymer, i.e., a polymer made predominantly of propylene with minor amounts of another olefin, usually a $C_2$–$C_4$ olefin. Alternatively, the core layer can have a polymeric matrix that comprises any polymer made from a $C_2$–$C_4$ olefin, such as ethylene or butene-1. For example, the core layer can have a polymeric matrix of high density polyethylene (HDPE).

The core layer can optionally include from about 2 to about 10 wt % of a cavitating agent to form a white opaque, coextruded, heat sealable film. The cavitating agent can be any material, which is capable of cavitating the core layer without causing degradation to the film material. Examples of cavitating agents include polybutylene terephthalate and calcium carbonate. U.S. Pat. No. 5,691,043 contains a more detailed discussion of cavitating agents.

The core layer can also optionally include a hydrocarbon additive to improve barrier characteristics of the film, such as, for example, water vapor and oxygen barrier characteristics. The hydrocarbon additive can be present in an amount of up to about 9 wt %, based on the entire weight of the core layer. The hydrocarbon additive may be a low molecular weight, hydrogenated hydrocarbon which is compatible with the thermoplastic polymer of the core layer and which provides the desired enhancement of film properties. The hydrocarbon additive may have a number average molecular weight less than about 5,000, for example, less than about 2,000, e.g., from about 500 to about 1,000.

The hydrocarbon additive can be natural or synthetic and may have a softening point of from about 60° C. to about 180° C. Hydrocarbon resins are examples of suitable hydrocarbons, which can be subsequently hydrogenated. Examples of hydrocarbon resins include petroleum resins, terpene resins, styrene resins, and cyclopentadiene resins. U.S. Pat. No. 5,667,902 contains a more complete discussion on hydrocarbon additives.

The coextruded, heat-sealable film structure includes a functional layer. The functional layer can comprise a polymeric matrix comprising a film-forming polymer having properties suitable for extrusion and uniaxial or biaxial orientation (by stretching the extrudate in the machine direction and/or transverse direction under elevated temperatures) and for forming skin layers on the outer surfaces of the core layer.

The polymeric matrix can be those thermoplastic polymers suitable for being treated for printing, sealing, or laminating or those thermoplastic polymers, which are printable, sealable, or capable of being laminated without treatment. If the functional layer is to be sealed, the thermoplastic polymer may be selected from the group consisting of ethylene-propylene random copolymer, propylene-butylene copolymer, ethylene-propylene-butylene terpolymer, medium density polyethylene (MDPE), linear low density polyethylene (LLDPE), ethylene vinyl acetate (EVA), ethylene-methyl acrylate (EMA), and blends thereof. If the functional layer is to be printed and/or laminated, the thermoplastic polymer may be selected from the group consisting of propylene homopolymer, ethylene-propylene block copolymer, high density polyethylene (HDPE), ethylene vinyl alcohol copolymer (EVOH), ethylene-propylene random copolymer, propylene-butylene copolymer, ethylene-propylene-butylene terpolymer, MDPE, LLDPE, EVA, EMA, and blends thereof.

It is to be understood that additives may be included within the polymeric matrix of the functional layer.

The functional layer may contain antiblock additives used in amounts ranging from about 0.1 wt % to about 3 wt % based upon the entire weight of the functional layer. Antiblock additives include inorganic particulates such as silicon dioxide, e.g., a particulate antiblock sold by W. R. Grace under the trademark "SYLOBLOC 44", calcium carbonate, magnesium silicate, aluminum silicate, calcium phosphate, and, e.g., Kaopolite.

Another useful particulate antiblock agent is referred to as a non-meltable, crosslinked silicone resin powder sold under the trademark "TOSPEARL" made by Toshiba Silicone Co., Ltd.; TOSPEARL is described in U.S. Pat. No. 4,769,418. Another useful antiblock additive is a spherical particle made from methyl methacrylate resin; it is sold under the trademark "EPOSTAR" and is commercially available from Nippon Shokubai.

The surface of the functional layer may be treated so as to provide sealability and/or printability. This includes surface treatment of any kind known to enhance surface tension properties, such as flame or corona treatment.

When the functional layer is an EVOH laminating/print surface layer, surface treatment is not necessary, but a suitable tie layer is necessary between the laminating/print functional layer and the core layer in order to achieve adequate skin adhesion. The EVOH laminating/print functional layer further enhances the oxygen barrier and flavor/aroma barrier properties of the multilayer film.

The coextruded, heat-sealable film structure includes a heat-sealable layer. The heat-sealable layer may comprise, as a polymeric matrix, a film-forming polymer having properties suitable for extrusion and uniaxial or biaxial orientation (by stretching the extrudate in the machine direction and/or transverse direction under elevated temperatures) and for forming skin layers on the outer surfaces of the core layer.

Any known low temperature sealant resin can be used to provide the polymeric matrix of the heat-sealable layer. Examples include ethylene-propylene random copolymer, propylene-butylene random copolymer, ethylene-propylene-butylene terpolymer, linear low density polyethylene (LLDPE), low density polyethylene (LDPE), metallocene-catalyzed polyethylenes, ethylene vinyl acetate (EVA), ethylene-methyl acrylate (EMA), ionomer (e.g., Surlyn from DuPont), or blends thereof.

Generally, the surface of the heat-sealable layer is untreated, but it may optionally be treated.

The heat-sealable layer is made with a particular slip system. The heat-sealable layer contains, as the slip system, silicone gum in combination with at least one functional antiblocking agent.

Silicone gum is a high-viscosity polydialkyl siloxane compound. An example of a structure of a silicone gum is $HOMe_2SiO(Me_2SiO)_nSiMe_2OH$, in which Me is methyl and n is an integer having a value which can be as much as 10,000.

Silicone gums are not flowable at room temperature, whereas silicone oils are flowable fluids at room temperature. Silicone gums may have the consistency of tough putty or hard deformable plastic. Silicone gums may have a durometer hardness of at least about 5 or a penetration number of about 1500 or less. Penetration number is used to describe the hardness or viscosity of asphalt or bitumen and other substances of similar consistency, with higher values denoting softness or lower viscosity: Corbett, L. W. and R. Urban (1985), Asphalt and Bitumen, Ullmann's Encyclopedia of Industrial Chemistry, W. Gerhartz, Deerfield Beach Fla., USA, VCH Publishers, A.3:163–188.

The viscosity of silicone gum may exceed $10^6$ cSt, for example, the viscosity of silicone gum may be from about 10 to about 20 million cSt, e.g., about 15 million cSt. Silicone gums may have a Williams plasticity (ASTM D 926) of at least 95.

The high molecular weight and high viscosity of silicone gum impede it from migrating throughout the film structure or from surface to surface. Thus, silicone gum displays less of a transfer effect, which lends the multilayer film improved converting properties. When properly blended and extruded with the polymer of the heat-sealable layer, moreover, the silicone gum is evenly distributed throughout the polymer of the heat-sealable layer.

The silicone gum can be in the form of a silicone polymer dispersed in polypropylene or polyethylene. Ultra-high molecular weight silicone gum of this kind is available in masterbatch form from the Dow Corning Corporation, of Midland, Mich., under the product designations "MB50-001" and "MB50-002".

The silicone gum can be included in the heat-sealable layer of the coextruded, heat-sealable film structure in an amount of from about 0.2 to about 2 wt %, based on the entire weight of the heat-sealable layer. In the case where the silicone gum is added in masterbatch form, sufficient amounts of masterbatch can be used to ensure that the final level of silicone gum falls within the desired level of from about 0.2 to about 2 wt %, based on the entire weight of the heat-sealable layer. For example, from about 0.4 to about 4 wt % of Dow Corning's MB50-001 masterbatch can be added to the heat-sealable layer.

Any one or more of the antiblocking agents that can be included in the functional layer can also be used as the functional antiblocking agents in the slip system of the heat-sealable layer. For example, EPOSTAR PMMA organic antiblock (available from Nippon Shokubai) and TOSPEARL cross-linked polymonoalkylsiloxane antiblock each provide an excellent surface modification for improved COF and machinability.

The antiblocking agents can be included in the heat-sealable layer of the coextruded, heat-sealable film structure in an amount of from about 0.05 to about 0.5 wt %, based on the entire weight of the heat-sealable layer. The average antiblock particle size can vary. For example, the average antiblock particle size can be in the range of from about 1 to about 5 μm, e.g., from about 2 to about 3 μm.

By employing sufficient amounts of the silicone gum/antiblocking agent slip system in the heat-sealable layer, a coextruded, heat-sealable film structure is provided that (i) exhibits excellent COF, hot slip, and machinability even after printing and laminating, (ii) exhibits excellent ink adhesion and bond strengths in lamination, (iii) functions very well as both an inside or an outside web in a lamination, and (iv) can be prepared without migrating additives that require aging after production.

Coextruded, heat-sealable film structures may contain antistatic agents in the core layer in order to prevent static or cling. Examples of antistatic agents include alkali metal alkanesulfonates, polyether-modified polydiorganosiloxanes such as polydialkylsiloxanes, polyalkylphenylsiloxanes and tertiary amines. These migrating types of additives, however, can cause problems during converting, such as build-up on laminator presses or ink adhesion issues.

Therefore, the present coextruded, heat-sealable film structure can be prepared without any antistatic additives in order to prevent or eliminate any converting issues associated with antistatic agents. The present film structure, without antistatic additives, exhibits excellent machinability on typical packaging machines.

Coextruded, heat-sealable film structures may contain fatty acid amides as slip additives. Specific examples of fatty acid amide slip additives are erucamide and oleamide. These fatty acid amide materials, however, disadvantageously depend on film temperature and storage time to promote the migration and effectiveness of this type of slip system. Fatty acid amide slip systems also have reduced functionality when the film is laminated to other non-slip containing films and the COF increases after lamination.

Therefore, the present coextruded, heat-sealable film structure can be prepared without any fatty acid amide slip additives. The present film structure, without fatty acid amide slip additives, exhibits excellent machinability on typical packaging machines.

The overall thickness of the coextruded, heat-sealable film structure can vary within wide limits and depends on the intended use. The core layer usually represents about 70 to about 90 percent of the thickness of the total film. For example, the core layer can be from about 5 to about 50 μm thick, the functional layer can be from about 0.25 to about 3.0 μm thick, and the heat-sealable layer can be from about 0.5 to about 7.0 μm thick.

The coextruded, heat-sealable film structure may be formed by coextruding the thermoplastic polymer core layer together with the heat-sealable layer and functional layer through a flat sheet extruder die at a temperature ranging from between about 200° C. to about 250° C., casting the film onto a cooling drum and quenching the film. The sheet may then be stretched about 3 to about 7 times in a machine direction (MD) orienter followed by stretching about 5 to about 10 times in the transverse direction (TD) orienter. The film may then be wound onto a reel.

In general, the film of the present invention may comprise at least three layers: the core layer; the heat-sealable layer (an outermost skin layer); and the functional layer (an outermost skin later). It is contemplated that additional layers can be incorporated between the core layer and the outermost skin layers, e.g., tie layers comprising polypropylene or polyethylene. The skin layers are usually coextensively applied to each major surface of the core layer, typically by coextrusion, as noted above.

When using the multilayer films of the present invention, it is often desirable to laminate a second film thereto. The second film may also be a multilayer film of the present invention. An example of a laminate structure according to the present invention can be a structure which, from top to bottom, comprises: a heat-sealable layer; a core layer, a functional layer with a functional layer laminated thereto; a core layer; and a heat-sealable layer. Prior to lamination, the functional layers can be printed on.

Extrusion lamination with polyethylene or polypropylene may be employed to produce the desired lamination of the two films. The laminate structure, however, can be produced by other methods, such as adhesive lamination, wherein an adhesive coating is used to form laminated film structures. Laminating methods that can be adapted for use with the films of the present invention are described, for example, in U.S. Pat. Nos. 4,916,025, 5,223,346, 5,302,442, 5,500,283, and 5,527,608.

EXAMPLES

In each of Examples 1–5 and Comparative Examples 1–6, three-layer oriented films, each having a functional layer of HDPE, a core layer of polypropylene homopolymer, and a heat-sealable layer of EPB terpolymer, were produced. The HDPE was Exxon HD6704.67, sold by ExxonMobil Chemical Company. The PP homopolymer was Fina 3371, sold by Fina Oil and Chemical Company. The EPB terpolymer was Chisso XPM7790, sold by Chisso Corporation.

In each of Examples 1–5 and Comparative Examples 1–6, the three layers were coextruded and stretched approximately 5 times in a machine direction (MD) and approximately 8 times in a transverse direction (TD). The MD orientation temperature ranged from 90° C. to 105° C., and the TD orientation temperature ranged from 160° C. to 170° C.

In each of Examples 1 and 2 and Comparative Examples 1–6, the heat-sealable layer had a thickness of 1 μm. In Examples 3 and 4, the heat-sealable layer had a thickness of 0.58 μm. In Example 5, the heat-sealable layer had a thickness of 0.70 μm.

In all of the Examples, the functional layer was flame treated.

The results from Examples 1–5 and Comparative Examples 1–6 are summarized below in Table 1. In Table 1, the machinability of the film was determined by testing on Mobil's Vertical Form Fill and Seal packaging machine (Mirapak). The acronym FOFC refers to a Force Over the Forming Collar test, and the numerical values listed for machinability refer to pull force in lbs. ASTM D1894 provided the procedure for determining the static and kinetic COF.

As can be seen from Table 1 (below), when the slip system employed in the heat-sealable layer is a combination of silicone gum and at least one antiblocking agent, the film's properties and performance are optimized. In particular, both the COF and hot slip results are low and the convertability is improved, while still maintaining excellent machinability (as measured by, for example, the "force over forming collar" test (FOFC)) on the packaging machines.

On the other hand, Table 1 demonstrates that when the slip system utilized comprises silicone oil, the film exhibits inferior ink adhesion and lamination bond strength. Table 1 further demonstrates that reduced levels of silicone oil in combination with an antiblock agent negatively impacts the machinability of the film.

Additionally, Table 1 demonstrates that a slip system comprising a fatty acid amide and an antiblock agent negatively impacts machinability.

Table 1 also demonstrates that a slip system consisting of only an antiblock agent is not fit-for-use in terms of its COF and machinability performance, although it does exhibit satisfactory convertibility.

What is claimed is:

1. A laminate film structure, comprising a first film laminated to a second film, wherein the first film is a heat-sealable film structure comprising:
   (a) a core layer comprising a thermoplastic polymer, the core layer having a first side and a second side;
   (b) a functional layer on the first side of the core layer, wherein the functional layer is selected from the group consisting of a laminating layer, a printable layer, a laminating and a printable layer, and a sealable layer; and
   (c) a heat-sealable layer on the second side of the core layer comprising (i) a thermoplastic polymer and (ii) a slip system comprising a silicone gum having a viscosity in the range of 10 to 20 million centistokes present in amount from about 0.2 wt. % to about 2.0 wt. % of the heat-sealable layer and at least one antiblocking agent present in an amount from about 0.05 wt. % to about 0.5 wt. % of the heat-sealable layer;
   (d) wherein the second film is comprised of the same structure as the first film.

2. A laminate film structure, comprising a first film laminated to a second film, wherein the first film is a heat-sealable film structure comprising:
   (a) a core layer comprising a thermoplastic polymer, the core layer having a first side and a second side;
   (b) a functional layer on the first side of the core layer, wherein the functional layer is selected from the group consisting of a laminating layer, a printable layer, a laminating and a printable layer, and a sealable layer; and

TABLE 1

| | Slip System | | COF | COF | | | | Machinability | |
| | Additive (%) | Antiblock Agent (%) | Trt/Trt (kinetic) | Unt/Unt (kinetic) | Hot Slip U/U @ 275 | Convertibility (Ink adhesion + lamination bond strength) | Machinability | FOFC | Hot Slip @ 290° |
|---|---|---|---|---|---|---|---|---|---|
| Ex. No. | | | | | | | | | |
| 1 | Silicone Gum (1%) | Tospearl (0.1%) | 0.25 | 0.34 | 1.8 | Good | Excellent | 14 | 15 |
| 2 | Silicone Gum (1%) | Epostar (0.2%) | 0.25 | 0.31 | 1.5 | Good | Excellent | 13 | 16 |
| 3 | Silicone Gum (1.5%) | Tospearl (0.1%), Epostar (0.1%) | 0.23 | 0.12 | 0.46 | Good | Excellent | 13 | 14 |
| 4 | Silicone Gum (0.5%) | Epostar (0.25%) | 0.29 | 0.22 | 0.71 | Good | Excellent | 12 | 13 |
| 5 | Silicone Gum (0.5% | Epostar (0.25%) | 0.32 | 0.27 | 1.17 | Good | Excellent | 16 | 17 |
| Comparative Examples | | | | | | | | | |
| 1 | Silicone Oil (1.25%) | Syloblock (0.23%) | 0.37 | 0.20 | 1.6 | Inconsistent | Excellent | 15 | 16 |
| 2 | Silicone Oil (0.6%) | Epostar (0.4%) | 0.28 | 0.33 | 1.4 | Inconsistent | Marginal | 17 | 18 |
| 3 | Erucamide | Syloblock (0.1%) | 0.30 | 0.30 | 1.2 | Good | Inconsistent | Varies | |
| 4 | Erucamide (0.4%) | Epostar (0.4%) | 0.52 | 0.42 | 1.7 | Good | Poor | 27 | 28 |
| 5 | None | Tospearl (0.3%) | 0.51 | 0.67 | 1.8 | Good | Poor | 21 | 23 |
| 6 | Silicone Gum | None | — | — | — | Good | Poor | — | — |

(c) a heat-sealable layer on the second side of the core layer comprising (i) a thermoplastic polymer and (ii) a slip system comprising a silicone gum having a viscosity in the range of 10 to 20 million centistokes present in amount from about 0.2 wt. % to about 2.0 wt. % of the heat-sealable layer and at least one antiblocking agent present in an amount from about 0.05 wt. % to about 0.5 wt. % of the heat-sealable layer, (d) wherein the antiblocking agent is a particulate antiblocking agent having an avenge particle size of from about 1 to about 5 μm.

3. A coextruded heat-sealable film structure, comprising:
(a) a core layer comprising a thermoplastic polymer, the core layer having a first side and a second side;
(b) a functional layer on the first side of the core layer, wherein the functional layer is selected from the group consisting of a laminating layer, a printable layer, a laminating and a printable layer, and a sealable layer; and
(c) a heat-sealable layer on the second side of the core layer comprising (i) a thermoplastic polymer and (ii) a slip system comprising a silicone gum having a viscosity in the range of 10 to 20 million centistokes present in amount from about 0.2 wt. % to about 2.0 wt. % of the heat-sealable layer and at least one antiblocking agent present in an amount from about 0.05 wt. % to about 0.5 wt. % of the heat-sealable layer;
(d) wherein the core layer has a polymeric matrix selected from the group consisting of a ethylene propylene copolymer, propylene butylene copolymer, and a high density polyethylene; and
(e) wherein the heat-sealable layer is comprised of a material selected from the group consisting of ethylene vinyl acetate, ethylene-methyl acrylate, an ionomer, and blends thereof.

4. A coextruded heat-sealable film structure, comprising:
(a) a core layer comprising a thermoplastic polymer, the core layer having a first side and a second side;
(b) a functional layer on the first side of the core layer, wherein the functional layer is selected from the group consisting of a laminating layer, a printable layer, a laminating and a printable layer, and a sealable layer; and
(c) a heat-sealable layer on the second side of the core layer comprising (i) a thermoplastic polymer and (ii) a slip system comprising a silicone gum having a viscosity in the range of 10 to 20 million centistokes present in amount from about 0.2 wt. % to about 2.0 wt. % of the heat-sealable layer and at least one antiblocking agent present in an amount from about 0.05 wt. % to about 0.5 wt. % of the heat-sealable layer;
(d) wherein the core layer has a polymeric matrix selected from the group consisting of a ethylene propylene copolymer, propylene butylene copolymer, and a high density polyethylene; and
(e) wherein the core layer comprises a cavitating agent selected from the group consisting of polybutylene terephthalate, calcium carbonate, and blends thereof.

5. The coextruded heat-sealable film structure of claim 4, wherein the functional layer comprises a material selected from the group consisting of an ethylene vinyl alcohol copolymer, a propylene-butylene copolymer, an ethylene vinyl acetate, an ethylene-methyl acrylate, and blends thereof.

6. The coextruded heat-sealable film structure of claim 4, wherein the antiblocking agent is selected from the group consisting of cross linked silicone resin powder, methyl methacrylate resin powder, a spherical silica powder, and blends thereof.

7. A laminate film structure, comprising a first film laminated to a second film, wherein the first film is a heat-sealable film structure comprising:
(a) a core layer comprising a thermoplastic polymer, the core layer having a first side and a second side;
(b) a functional layer on the first side of the core layer, wherein the functional layer is selected from the group consisting of a laminating layer, a printable layer, a laminating and a printable layer, and a sealable layer; and
(c) a heat-sealable layer on the second side of the core layer comprising (i) a thermoplastic polymer and (ii) a slip system comprising a silicone gum having a viscosity in the range of 10 to 20 million centistokes present in amount from about 0.2 wt. % to about 2.0 wt. % of the heat-sealable layer and at least one antiblocking agent present in an amount from about 0.05 wt. % to about 0.5 wt. % of the heat-scalable layer;
(d) wherein the core layer has a polymeric matrix selected from the group consisting of a propylene homopolymer, a propylene copolymer, and a polyethylene.

8. The laminate film structure of claim 7, wherein the core layer further comprises an additive selected from the group consisting of a natural hydrocarbon additive, a synthetic hydrocarbon additive, a cavitating agent, an antistatic agent, and mixtures thereof.

9. The laminate film structure of claim 7, wherein the functional layer further comprises at least one antiblock additive.

10. The laminate film structure of claim 7, wherein the surface of the functional layer is flame treated or corona treated and the surface of the heat-sealable layer is untreated.

11. The laminate film structure of claim 7, wherein the thermoplastic polymer of the heat-sealable layer is selected from the group consisting of an ethylene-propylene random copolymer, a propylene-butylene random copolymer, an ethylene-propylene-butylene terpolymer, a linear low density polyethylene, a low density polyethylene, a metallocene-catalyzed polyethylene, an ethylene vinyl acetate, an ethylene-methyl acrylate, an ionomer, and blends thereof and the functional layer has a polymeric matrix selected from the group consisting of a propylene polymer, an ethylene-propylene block copolymer, a high density polyethylene, an ethylene vinyl alcohol copolymer, an ethylene-propylene random copolymer, a propylene-butylene copolymer, an ethylene-propylene-butylene terpolymer, a medium density polyethylene, a linear low density polyethylene, an ethylene vinyl acetate, an ethylene-methyl acrylate, and blends thereof.

12. A laminate film structure, comprising a first film laminated to a second film, wherein the first film is a heat-sealable film structure comprising:
(a) a core layer comprising a thermoplastic polymer, the core layer having a first side and a second side;
(b) a functional layer on the first side of the core layer, wherein the functional layer is selected from the group consisting of a laminating layer, a printable layer, a laminating and a printable layer, and a sealable layer; and
(c) a heat-sealable layer on the second side of the core layer comprising (i) a thermoplastic polymer and (ii) a slip system comprising a silicone gum having a viscosity in the range of 10 to 20 million centistokes present in amount from about 0.2 wt. % to about 2.0 wt. % of the heat-sealable layer and at least one antiblocking agent present in an amount from about 0.05 wt. % to about 0.5 wt. % of the heat-sealable layer (d) wherein the core layer has a polymeric matrix selected from the group consisting of an ethylene propylene copolymer, propylene butylene copolymer, and a high density polyethylene.

13. The laminate film structure of claim 12, wherein the thermoplastic polymer of the heat-sealable layer is selected from the group consisting of a propylene-butylene random copolymer, a metallocene catalyzed polyethylene, an ethylene vinyl acetate, and an ethylene-methyl acrylate, an ionomer, and blends thereof.

14. The laminate film structure of claim 12, wherein the core layer comprises a cavitating agent selected from the group consisting of polybutylene terephtalate, calcium carbonate, and blends thereof.

15. The laminate film structure of claim 12, wherein the care layer is from about 5 to about 50 μm thick, the functional layer is from about 0.25 to about 3.0 μm thick, and the heat-sealable layer is from about 0.5 to about 7 μm thick.

16. The laminate film structure of claim 12, wherein the core layer is free of an antistatic agent and a fatty acid amide slip additive.

17. A coextruded heat-sealable film structure, comprising:

(a) a core layer comprising a thermoplastic polymer, the core layer having a first side and a second side;

(b) a functional layer on the first side of the core layer, wherein the functional layer is selected from the group consisting of a laminating layer, a printable layer, a laminating and a printable layer, and a sealable layer; and (c) a heat-sealable layer on the second side of the core layer comprising (i) a thermoplastic polymer and (ii) a slip system comprising a silicone gum having a viscosity in the range of 10 to 20 million centistokes present in amount from about 0.2 wt. % to about 2.0 wt. % of the heat-sealable layer and at least one antiblocking agent present in an amount from about 0.05 wt. % to about 0.5 wt. % of the heat-sealable layer;

(d) wherein the core layer has a polymeric matrix selected from the group consisting of a ethylene propylene copolymer, propylene butylene copolymer, and a high density polyethylene; and (e) wherein the functional layer is comprised of a material selected from the group consisting of ethylene vinyl acetate, ethylene-methyl acrylate, ethylene vinyl alcohol copolymer, propylene-butylene copolyrner, and blends thereof.

18. The coextruded heat-sealable film structure of claim 17, wherein the heat-sealable layer is comprised of a material selected from the group consisting of ethylene vinyl acetate, ethylene-methyl acrylate, an ionomer, and blends thereof.

* * * * *